(12) United States Patent
Okamoto et al.

(10) Patent No.: US 11,745,418 B2
(45) Date of Patent: Sep. 5, 2023

(54) METHOD OF MANUFACTURING THREE-DIMENSIONALLY FORMED OBJECT AND THREE-DIMENSIONALLY FORMED OBJECT MANUFACTURING APPARATUS

(71) Applicant: SEIKO EPSON CORPORATION, Tokyo (JP)

(72) Inventors: Eiji Okamoto, Matsumoto (JP); Masaya Ishida, Hara-mura (JP); Toshimitsu Hirai, Hokuto (JP)

(73) Assignee: Seiko Epson Corporation, Tokyo (JP)

( * ) Notice: Subject to any disclaimer, the term of this patent is extended or adjusted under 35 U.S.C. 154(b) by 255 days.

(21) Appl. No.: 17/165,604

(22) Filed: Feb. 2, 2021

(65) Prior Publication Data

US 2021/0162730 A1    Jun. 3, 2021

Related U.S. Application Data

(63) Continuation of application No. 15/292,005, filed on Oct. 12, 2016, now abandoned.

(30) Foreign Application Priority Data

Oct. 15, 2015  (JP) ................................. 2015-203487

(51) Int. Cl.
*B29C 64/153*  (2017.01)
*B33Y 10/00*  (2015.01)
(Continued)

(52) U.S. Cl.
CPC ............ *B29C 64/165* (2017.08); *B22F 1/107* (2022.01); *B22F 10/14* (2021.01); *B22F 10/43* (2021.01);
(Continued)

(58) Field of Classification Search
CPC ........ B29C 64/153; B33Y 10/00; B33Y 70/00
See application file for complete search history.

(56) References Cited

U.S. PATENT DOCUMENTS 5,387,380 A    2/1995  Cima et al.
5,555,481 A    9/1996  Rock et al.
(Continued)

FOREIGN PATENT DOCUMENTS

CN    104785786    7/2015
EP    0764487    3/1997
(Continued)

OTHER PUBLICATIONS

Machine Translation of JP 2003159754 (Year: 2023).*
(Continued)

*Primary Examiner* — Russell E Sparks
(74) *Attorney, Agent, or Firm* — WORKMAN NYDEGGER

(57) ABSTRACT

A method of manufacturing a three-dimensionally formed object includes: forming a layer using a flowable composition including constituent material particles of a three-dimensionally formed object and a flowable composition including support portion-forming particles for forming a support portion which supports the three-dimensionally formed object during the formation of the three-dimensionally formed object; and imparting energy to the constituent material particles and the support portion-forming particles, in which in the imparting of the energy, the energy is imparted such that a temperature of the constituent material particles and a temperature of the support portion-forming particles are equal to or higher than a melting point of the constituent material particles and are lower than a melting point of the support portion-forming particles.

7 Claims, 12 Drawing Sheets

(51) Int. Cl.
*B33Y 70/00* (2020.01)
*B29C 64/165* (2017.01)
*B29C 64/112* (2017.01)
*B29C 64/321* (2017.01)
*B22F 1/107* (2022.01)
*B22F 10/14* (2021.01)
*B22F 12/53* (2021.01)
*B22F 12/55* (2021.01)
*B22F 10/43* (2021.01)
*B22F 10/47* (2021.01)
*B33Y 30/00* (2015.01)
*B28B 1/00* (2006.01)
*B22F 10/36* (2021.01)
*B22F 10/38* (2021.01)
*B33Y 50/02* (2015.01)
*B29K 105/16* (2006.01)
*B29K 505/00* (2006.01)

(52) U.S. Cl.
CPC ........... *B22F 10/47* (2021.01); *B22F 12/53* (2021.01); *B22F 12/55* (2021.01); *B29C 64/112* (2017.08); *B29C 64/153* (2017.08); *B29C 64/321* (2017.08); *B33Y 10/00* (2014.12); *B33Y 30/00* (2014.12); *B33Y 70/00* (2014.12); *B22F 10/36* (2021.01); *B22F 10/38* (2021.01); *B22F 2998/10* (2013.01); *B22F 2999/00* (2013.01); *B28B 1/001* (2013.01); *B29K 2105/16* (2013.01); *B29K 2505/00* (2013.01); *B33Y 50/02* (2014.12); *Y02P 10/25* (2015.11)

(56) References Cited

U.S. PATENT DOCUMENTS

| | | | |
|---|---|---|---|
| 6,066,285 A | 5/2000 | Kumar | |
| 6,830,643 B1 | 12/2004 | Hayes | |
| 7,261,542 B2 | 8/2007 | Hickerson et al. | |
| 8,057,731 B2 | 11/2011 | Abe | |
| 9,162,392 B2* | 10/2015 | Grebe | B29C 64/153 |
| 9,527,240 B2* | 12/2016 | Batchelder | B33Y 10/00 |
| 10,272,618 B2 | 4/2019 | Hays et al. | |
| 10,279,546 B2* | 5/2019 | Taniuchi | B33Y 10/00 |
| 2002/0129485 A1 | 9/2002 | Mok et al. | |
| 2005/0074596 A1 | 4/2005 | Nielsen et al. | |
| 2015/0197862 A1 | 7/2015 | Engel et al. | |
| 2017/0008231 A1 | 1/2017 | Hideaki et al. | |
| 2017/0014950 A1 | 1/2017 | Naotada | |
| 2017/0106446 A1 | 4/2017 | Okamoto et al. | |
| 2017/0217106 A1* | 8/2017 | Reese | B29C 64/40 |
| 2018/0222112 A1 | 8/2018 | Danzig et al. | |

FOREIGN PATENT DOCUMENTS

| | | | | |
|---|---|---|---|---|
| JP | H06-143438 | | 5/1994 | |
| JP | H06-218712 | | 8/1994 | |
| JP | H08-057967 | | 3/1996 | |
| JP | 2003159754 A | * | 6/2003 | ........... G03G 15/224 |
| JP | 2005-059289 | | 3/2005 | |
| JP | 2007-301945 | | 11/2007 | |
| JP | 2008-184622 | | 8/2008 | |
| JP | 2015-081380 | | 4/2015 | |
| JP | 2017-075364 | | 4/2017 | |
| JP | 2017-075366 | | 4/2017 | |
| JP | 2017-075367 | | 4/2017 | |
| JP | 2017-082293 | | 5/2017 | |
| WO | 2007-073206 | | 6/2007 | |
| WO | 2015-141032 | | 9/2015 | |
| WO | 2015-151614 | | 10/2015 | |

OTHER PUBLICATIONS

Sintering: Grain Boundaries, Interfaces, and Porosities, The American Ceramic Society, https://ceramics.org/wp-content/uploads/2014/04/Sintering-Lesson-FINAL-111.pdf (Year: 2019).

* cited by examiner

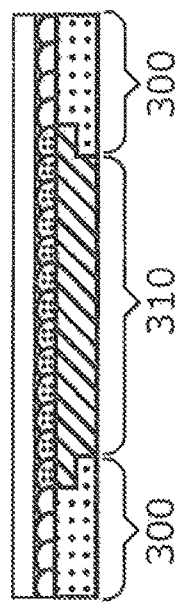
FIG. 9A
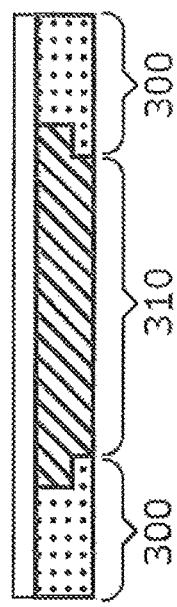
FIG. 9B
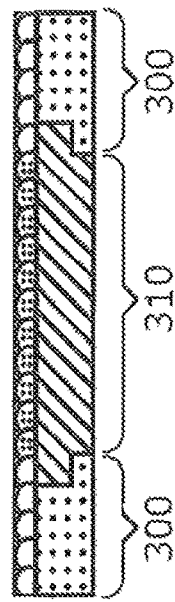
FIG. 9C
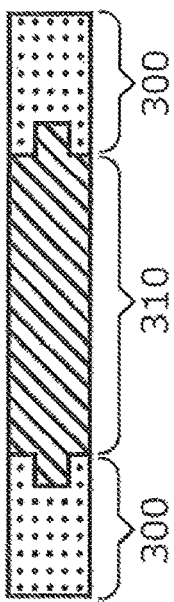
FIG. 9D
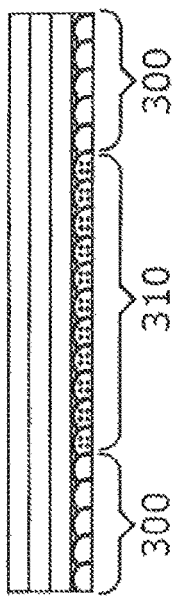
FIG. 9E
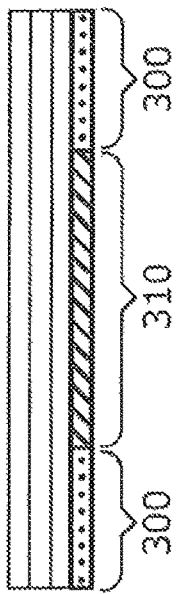
FIG. 9F
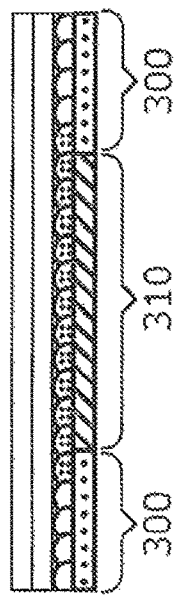
FIG. 9G
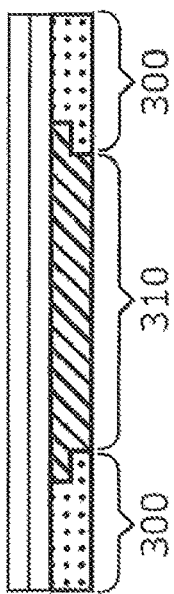
FIG. 9H
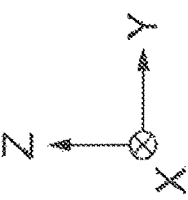

FIG.11A
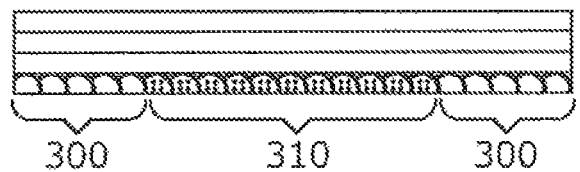
FIG.11B
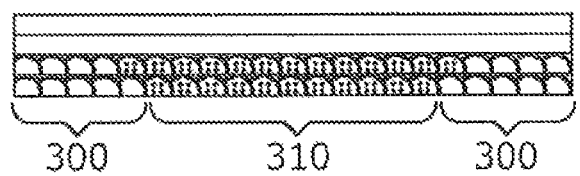
FIG.11C
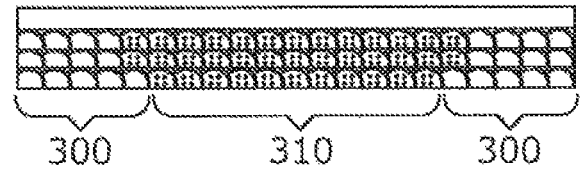
FIG.11D
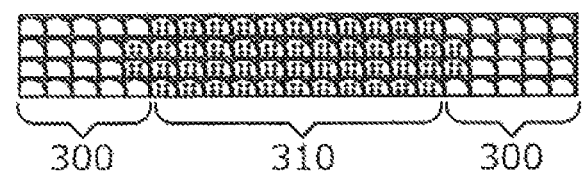
FIG.11E
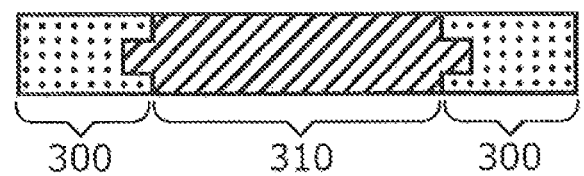
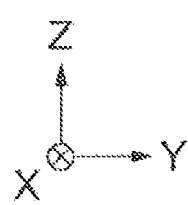

METHOD OF MANUFACTURING THREE-DIMENSIONALLY FORMED OBJECT AND THREE-DIMENSIONALLY FORMED OBJECT MANUFACTURING APPARATUS

BACKGROUND

1. Technical Field

The present invention relates to a method of manufacturing a three-dimensionally formed object and a three-dimensionally formed object manufacturing apparatus.

2. Related Art

In the related art, various methods of manufacturing a three-dimensionally formed object have been disclosed. Among these, a method of forming a three-dimensionally formed object using a fluid composition is disclosed.

For example, JP-A-2008-184622 discloses a method of manufacturing a three-dimensionally formed object, the method including: forming a layer using a metal paste as a fluid composition; and manufacturing a three-dimensionally formed object while irradiating a region of the layer corresponding to the three-dimensionally formed object with laser light to sinter or melt the region.

However, in a case where the three-dimensionally formed object is manufactured while sintering or melting the layer corresponding to the three-dimensionally formed object, other regions of the layer excluding the region corresponding to the three-dimensionally formed object are sintered or melted due to heat generated during the sintering or melting of the region corresponding to the three-dimensionally formed object. Therefore, when an extracting operation of extracting the three-dimensionally formed object, a forming operation after the extracting operation, or the like is performed, the load may be high. That is, in the method of manufacturing a three-dimensionally formed object in the related art, the number of steps performed after a three-dimensionally formed object is manufactured is not sufficiently reduced.

SUMMARY

An advantage of some aspects of the invention is to reduce the number of steps performed after a three-dimensionally formed object is formed.

A first aspect of the invention is directed to a method of manufacturing a three-dimensionally formed object including: forming a layer using a fluid composition including constituent material particles of a three-dimensionally formed object and a fluid composition including support portion-forming particles for forming a support portion which supports the three-dimensionally formed object during the formation of the three-dimensionally formed object; and imparting energy to the constituent material particles and the support portion-forming particles, in which in the imparting of the energy, the energy is imparted such that a temperature of the constituent material particles and a temperature of the support portion-forming particles are equal to or higher than a melting point of the constituent material particles and are lower than a melting point of the support portion-forming particles.

According to this aspect, the energy is imparted such that the temperature of the constituent material particles and the temperature of the support portion-forming particles are equal to or higher than the melting point of the constituent material particles and are lower than the melting point of the support portion-forming particles. Therefore, the melting of the support portion can be prevented while melting the constituent material of the three-dimensionally formed object. Therefore, when an extracting operation of extracting the three-dimensionally formed object, a forming operation after the extracting operation, or the like is performed, an increase in load caused by the melting of other regions of the layer excluding the region corresponding to the three-dimensionally formed object can be prevented. Accordingly, the number of steps performed after a three-dimensionally formed object is formed can be reduced.

A second aspect of the invention is directed to the method of manufacturing a three-dimensionally formed object according to the first aspect, in which in the forming of the layer, the fluid composition including the constituent material particles and the fluid composition including the support portion-forming particles are ejected in the form of liquid drops to form the layer.

According to this aspect, the fluid composition including the constituent material particles and the fluid composition including the support portion-forming particles are ejected in the form of liquid drops to form the layer. Therefore, by forming the layer, the three-dimensionally formed object can be simply formed.

A third aspect of the invention is directed to the method of manufacturing a three-dimensionally formed object according to the first or second aspect, in which the method further includes repeating the forming of the layer.

According to this aspect, the method of manufacturing a three-dimensionally formed object includes repeating the forming of the layer. Therefore, by repeating the forming of the layer, the three-dimensionally formed object can be simply formed.

A fourth aspect of the invention is directed to the method of manufacturing a three-dimensionally formed object according to any one of the first to third aspects, in which in the imparting of the energy, the energy is imparted such that a temperature of the constituent material particles and a temperature of the support portion-forming particles are equal to or higher than a sintering temperature of the support portion-forming particles.

According to this aspect, the energy is imparted such that the temperature of the constituent material particles and the temperature of the support portion-forming particles are equal to or higher than the sintering temperature of the support portion-forming particles. That is, the constituent material particles are melted, and the support portion-forming particles are sintered. Since the sintering portion can be simply separated from the melting portion, the number of steps performed after a three-dimensionally formed object is formed can be reduced.

A fifth aspect of the invention is directed to the method of manufacturing a three-dimensionally formed object according to any one of the first to fourth aspects, in which the forming of the layer is adjusted such that a thickness of a layer including the constituent material particles and a thickness of a layer including the support portion-forming particles which corresponds to the layer match with each other after the imparting of the energy.

According to this aspect, the forming of the layer is adjusted such that a thickness of a layer including the constituent material particles and a thickness of a layer including the support portion-forming particles which corresponds to the layer match with each other after the imparting of the energy. Therefore, since there is no difference in the thickness between the support layer and the constituent layer, it is not necessary to adjust the thicknesses of the layers, and a high-precision three-dimensionally formed object can be manufactured.

A sixth aspect of the invention is directed to the method of manufacturing a three-dimensionally formed object according to any one of the first to fifth aspects, in which the imparting of the energy is performed after performing the forming of the layer once or multiple times to form one layer or plural layers.

According to this aspect, the imparting of the energy is performed after performing the forming of the layer once or multiple times to form one layer or plural layers. For example, by performing the imparting of the energy after performing the forming of the layer multiple times to form plural layers, the number of times of performing the constituent layer forming step can be reduced, and a three-dimensionally formed object can be rapidly manufactured. By performing the imparting of the energy once to form a layer, even in a case where one material is disposed to cover the other material on an inclined surface or the like, the two materials are exposed to the same surface in each of the layers, and thus energy can be appropriately imparted to each of the materials.

A seventh aspect of the invention is directed to the method of manufacturing a three-dimensionally formed object according to any one of the first to sixth aspects, in which in the imparting of the energy, the same intensity of energy is imparted to the constituent material particles and the support portion-forming particles.

According to this aspect, the same intensity of energy is imparted to the constituent material particles and the support portion-forming particles. Therefore, the imparting of the energy can be simply performed.

An eighth aspect of the invention is directed to the method of manufacturing a three-dimensionally formed object according to any one of the first to sixth aspects, in which in the imparting of the energy, different intensities of energy are imparted to the constituent material particles and the support portion-forming particles.

According to this aspect, different intensities of energy are imparted to the constituent material particles and the support portion-forming particles. Therefore, when an extracting operation of extracting the three-dimensionally formed object, a forming operation after the extracting operation, or the like is performed, an increase in load caused by the melting or excessive sintering of other regions of the layer excluding the region corresponding to the three-dimensionally formed object can be prevented.

A ninth aspect of the invention is directed to the method of manufacturing a three-dimensionally formed object according to any one of the first to eighth aspects, in which a porosity of a layer including the constituent material particles is adjusted to be lower than a porosity of a layer including the support portion-forming particles which corresponds to the layer after the imparting of the energy.

According to this aspect, a porosity of a layer including the constituent material particles is adjusted to be lower than a porosity of a layer including the support portion-forming particles which corresponds to the layer after the imparting of the energy. Therefore, when an extracting operation of extracting the three-dimensionally formed object, a forming operation after the extracting operation, or the like is performed, an increase in load caused by an excessively low porosity of the layer including the support portion-forming particles can be prevented.

A tenth aspect of the invention is directed to the method of manufacturing a three-dimensionally formed object according to any one of the first to ninth aspects, in which a porosity of a layer including the support portion-forming particle after the imparting of the energy is adjusted to be lower than that before the imparting of the energy.

According to this aspect, a porosity of a layer including the support portion-forming particle after the imparting of the energy is adjusted to be lower than that before the imparting of the energy. Therefore, the strength of the support portion is improved, and there is an advantageous effect in that, before an extracting operation of extracting a three-dimensionally formed object, the three-dimensionally formed object can be reliably held.

An eleventh aspect of the invention is directed to the method of manufacturing a three-dimensionally formed object according to any one of the first to tenth aspects, in which the constituent material particles include at least one component of aluminum, titanium, iron, copper, magnesium, stainless steel, or maraging steel, and the support portion-forming particles include at least one component of silica, alumina, titanium oxide, or zirconium oxide.

According to this aspect, in the imparting of the energy, the constituent material particles can be easily controlled to be melted, and the support portion-forming particles can be controlled to have a low sintered density. While securing the strength of the three-dimensionally formed object, an increase in the load of an extracting operation of extracting the three-dimensionally formed object, a forming operation after the extracting operation, or the like can be prevented.

A twelfth aspect of the invention is directed to a three-dimensionally formed object manufacturing apparatus including: an ejecting portion that ejects a fluid composition including constituent material particles of a three-dimensionally formed object; an ejecting portion that ejects a fluid composition including support portion-forming particles for forming a support portion which supports the three-dimensionally formed object during the formation of the three-dimensionally formed object; a control portion that controls the three-dimensionally formed object manufacturing apparatus to form a layer using the fluid composition including the constituent material particles and the fluid composition including the support portion-forming particles; and an energy imparting portion that imparts energy to the constituent material particles and the support portion-forming particles, in which the energy imparting portion is adjusted to impart the energy such that a temperature of the constituent material particles and a temperature of the support portion-forming particles are equal to or higher than a melting point of the constituent material particles and are lower than a melting point of the support portion-forming particles.

According to this aspect, the energy is imparted such that the temperature of the constituent material particles and the temperature of the support portion-forming particles are equal to or higher than the melting point of the constituent material particles and are lower than the melting point of the support portion-forming particles. Therefore, the melting of the support portion can be prevented while melting the constituent material of the three-dimensionally formed object. Therefore, when an extracting operation of extracting the three-dimensionally formed object, a forming operation after the extracting operation, or the like is performed, an increase in load caused by the melting of other regions of the layer excluding the region corresponding to the three-dimensionally formed object can be prevented. Accordingly, the number of steps performed after a three-dimensionally formed object is formed can be reduced.

BRIEF DESCRIPTION OF THE DRAWINGS

The invention will be described with reference to the accompanying drawings, wherein like numbers reference like elements.

FIGS. 9A to 9H are diagrams schematically showing the process of manufacturing a three-dimensionally formed object according to an example of the invention.

FIGS. 11A to 11E are diagrams schematically showing a process of manufacturing a three-dimensionally formed object according to an example of the invention.

DESCRIPTION OF EXEMPLARY EMBODIMENTS

Figure 1:
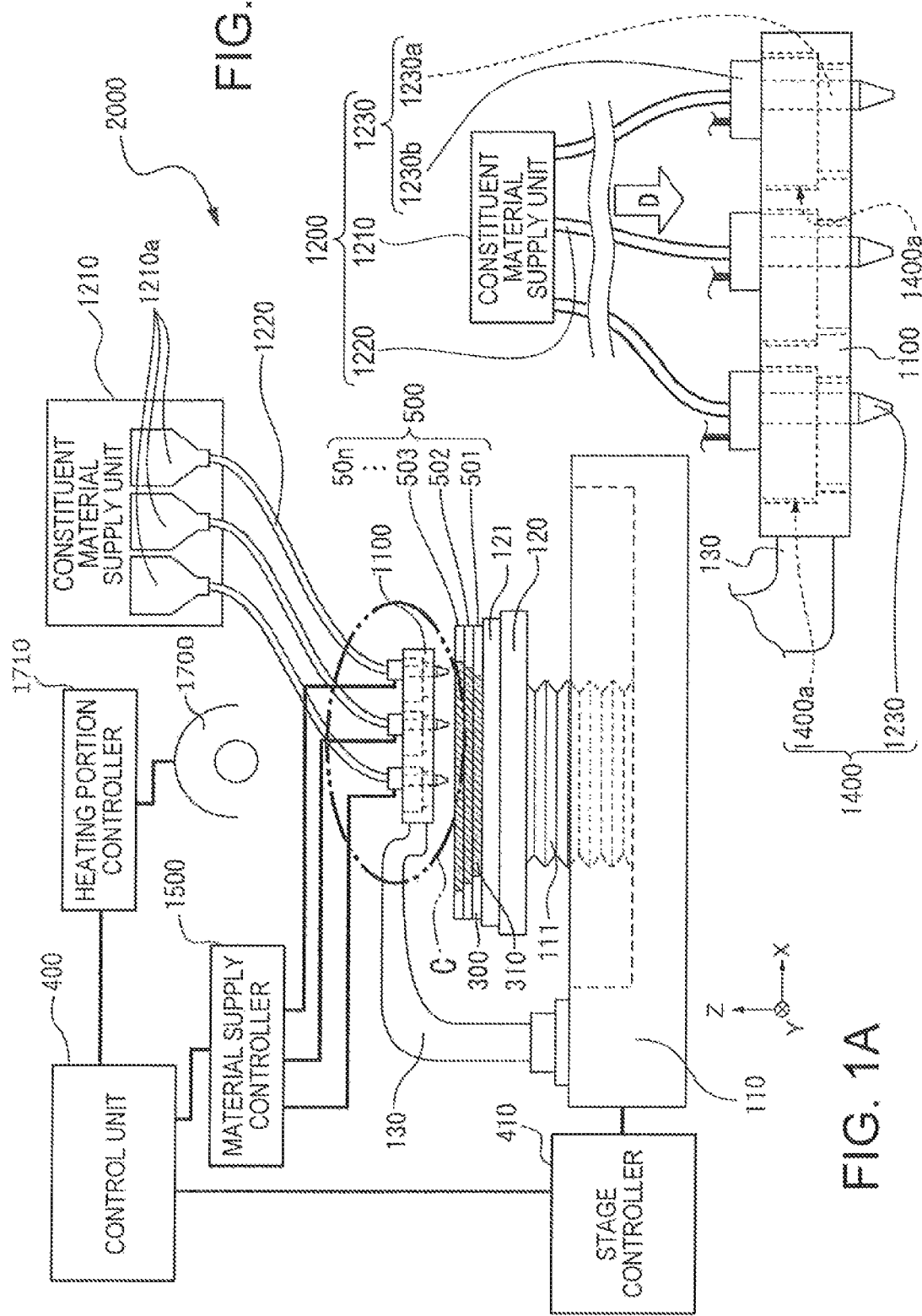
FIG. 1A is a diagram showing a schematic configuration of a three-dimensionally formed object manufacturing apparatus according to an embodiment of the invention.
FIG. 1B is an enlarged view showing a C portion shown in FIG. 1A.
Figure 2:
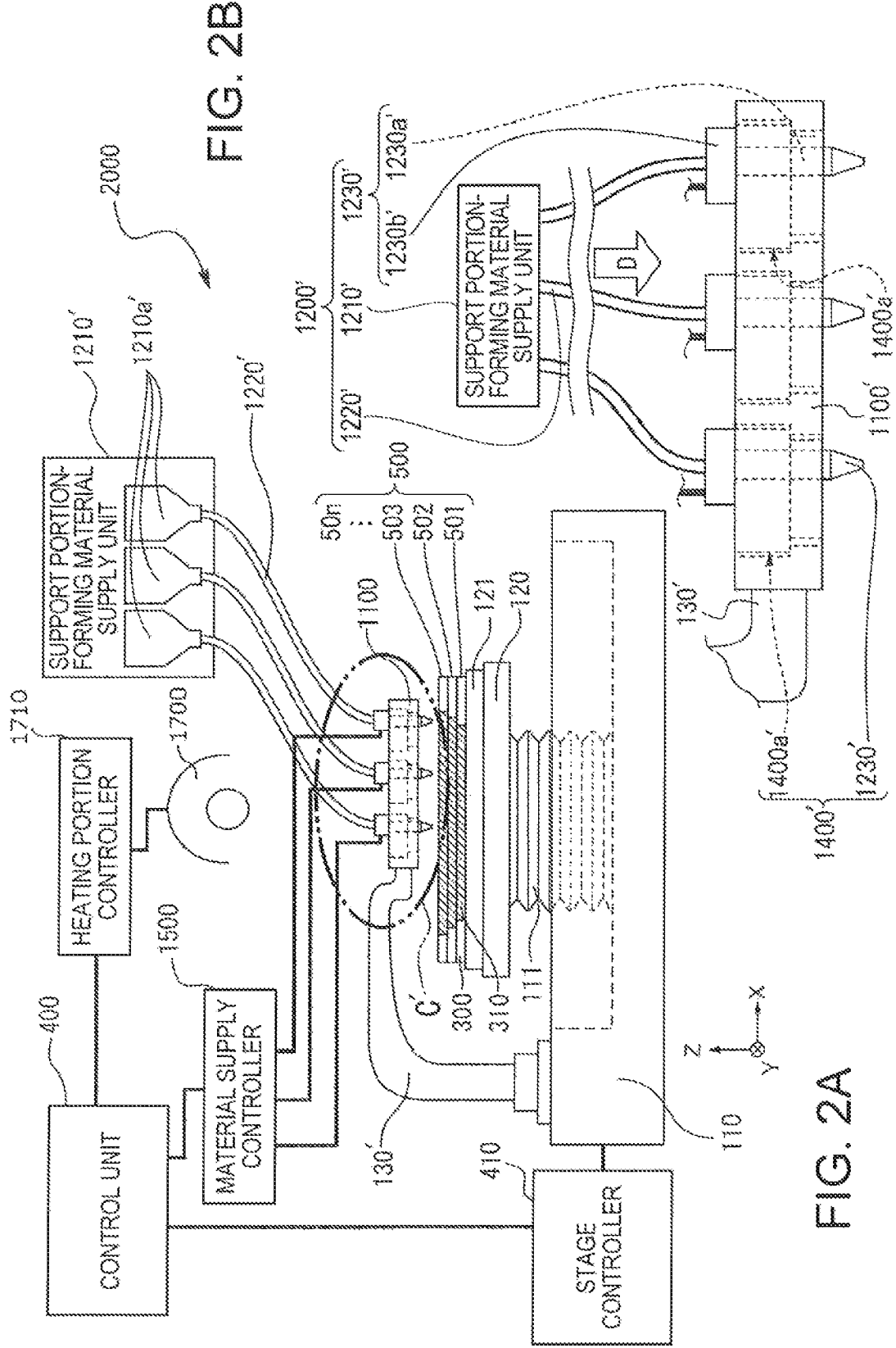
FIG. 2A is a diagram showing a schematic configuration of the three-dimensionally formed object manufacturing apparatus according to the embodiment of the invention.
FIG. 2B is an enlarged view showing a C' portion shown in FIG. 2A.

Hereinafter, embodiments of the invention will be described with reference to the drawings.

FIGS. 1A to 2B are diagrams showing a schematic configuration of a three-dimensionally formed object manufacturing apparatus according to an embodiment of the invention.

Here, the three-dimensionally formed object manufacturing apparatus according to the embodiment includes two kinds of material supply portions (head bases). However, in each of FIGS. 1A to 2B, only one of the material supply portions is shown, and the other material supply portion is not shown. In addition, the material supply portion shown in FIGS. 1A and 1B supplies a fluid composition (constituent material) including constituent material particles of a three-dimensionally formed object. The material supply portion shown in FIGS. 2A and 2B supplies a fluid composition (support portion-forming material) including support portion-forming particles for forming a support portion which supports the three-dimensionally formed object during the formation of the three-dimensionally formed object. Each of the fluid composition including the constituent material particles and the fluid composition including the support portion-forming particles may or may not include a solvent and a binder.

"Three-dimensional forming" described in this specification represents forming a so-called three-dimensionally formed object which also includes a planar formed object, that is, a so-called two-dimensional formed object having a thickness. In addition, the meaning of "support" includes supporting something from below or side and, in some cases, also includes supporting something from above.

A three-dimensionally formed object manufacturing apparatus 2000 (hereinafter, referred to as "forming apparatus 2000") shown in FIGS. 1A to 2B includes: a base 110; a stage 120 that is provided so as to move in X, Y, and Z directions shown in the drawing or to be driven in a rotating direction around a Z axis by a driving device 111 as a driving unit which is included in the base 110.

As shown in FIGS. 1A and 1B, the three-dimensionally formed object manufacturing apparatus 2000 includes a head base support portion 130. The base 110 is fixed to one end portion of the head base support portion 130. A head base 1100 in which plural head units 1400 are held is fixed to the other end portion of the head base support portion 130, in which each of the head units 1400 includes a constituent material ejecting portion that ejects the constituent material.

In addition, as shown in FIGS. 2A and 2B, the three-dimensionally formed object manufacturing apparatus 2000 includes a head base support portion 130'. The base 110 is fixed to one end portion of the head base support portion 130'. A head base 1100' in which plural head units 1400' are held is fixed to the other end portion of the head base support portion 130', in which each of the head units 1400' includes a support portion-forming material ejecting portion that ejects the support portion-forming material.

Here, the head base 1100 and the head base 1100' are provided in parallel on an XY plane.

The constituent material ejecting portion 1230 and the support portion-forming material ejecting portion 1230' have the same configuration, except that different materials (the constituent material and the support portion-forming material) are ejected. However, the invention is not limited to the above-described configuration.

In the process of forming a three-dimensionally formed object 500, layers 501, 502, and 503 are formed on the stage 120. In addition, in a region facing the stage 120, a heating portion 1700 is provided, and irradiation of heat energy thereof is controlled to be started or stopped by a heating portion controller 1710, which is connected to a control unit 400 described below, such that the entire region of the stage 120 can be heated.

In order to form the three-dimensionally formed object 500, heat energy is irradiated (energy is imparted) by the heating portion 1700. In order to protect the three-dimensionally formed object 500 from heat generated from the stage 120, the three-dimensionally formed object 500 may be formed on a sample plate 121 having heat resistance. As the sample plate 121, for example, a ceramic plate is used. As a result, high heat resistance can be obtained, the reactivity between the sample plate and the constituent material of the three-dimensionally formed object to be melted is low, and the deterioration of the three-dimensionally formed object 500 can be prevented. In FIGS. 1A and 2A, for convenience of description, a three-layer structure including the layers 501, 502, and 503 is adopted. However, layers (in FIGS. 1A and 2A, up to a layer 50*n*) may be formed until the three-dimensionally formed object 500 has a desired shape.

Here, each of the layers 501, 502, 503, and 50*n* includes: a support layer 300 that is formed of the support portion-forming material ejected from the support portion-forming material ejecting portion 1230'; and a constituent layer 310 (corresponding to a constituent region of the three-dimensionally formed object 500) that is formed of the constituent material ejected from the constituent material ejecting portion 1230. Once a single layer is formed using the constituent material ejected from the constituent material ejecting portion 1230 and the support portion-forming material ejected from the support portion-forming material ejecting portion 1230', the layer can be melted by the heating portion 1700 irradiating the entire region of the layer with heat energy. Further, by forming plural pairs of the constituent layers 310 and the support layers 300, the shape of a three-dimensionally formed object is completed. This three-dimensionally formed object can be melted in a thermostatic chamber (heating portion) which is provided separately from the forming apparatus 2000.

FIG. 1B is an enlarged view showing a C portion which is the head base 1100 shown in FIG. 1A. As shown in FIG. 1B, the head base 1100 holds the plural head units 1400. Although described below in detail, one head unit 1400 is formed by the constituent material ejecting portion 1230, which is included in a constituent material supply device 1200, being held by a holding jig 1400*a*. The constituent material ejecting portion 1230 includes: an ejection nozzle 1230*a*; and an ejection driving portion 1230*b* that is controlled by a material supply controller 1500 to eject the constituent material through the ejection nozzle 1230*a*.

FIG. 2B is an enlarged view showing a C' portion which is the head base 1100' shown in FIG. 2A. As shown in FIG. 2B, the head base 1100' holds the plural head units 1400'. One head unit 1400' is formed by the support portion-forming material ejecting portion 1230', which is included in a support portion-forming material supply device 1200', being held by a holding jig 1400'*a*. The support portion-forming material ejecting portion 1230' includes: an ejection nozzle 1230*a*'; and an ejection driving portion 1230*b*' that is controlled by the material supply controller 1500 to eject the support portion-forming material through the ejection nozzle 1230*a*'.

In the embodiment, the heating portion 1700 will be described as an energy irradiating portion which irradiates electromagnetic waves as heat energy. By using electromagnetic waves as the heat energy to be irradiated, a supply material as a target can be efficiently irradiated with energy, and a high-quality three-dimensionally formed object can be formed. In addition, for example, the intensity of irradiation energy (power, scanning rate) can be easily controlled according to, for example, the kinds of materials to be ejected, and a three-dimensionally formed object having a desired quality can be obtained. However, the invention is not limited to the above-described configuration, and the layers may be heated using another method. It is needless to say that the invention is not limited to the configuration in which the layers are melted by electromagnetic waves.

As shown in FIGS. 1A and 1B, the constituent material ejecting portion 1230 is connected to a constituent material supply unit 1210 through a supply tube 1220, the constituent material supply unit 1210 accommodating the constituent material and corresponding to each of the head units 1400 which are held in the head base 1100. A predetermined constituent material is supplied from the constituent material supply unit 1210 to the constituent material ejecting portion 1230. The constituent material supply unit 1210 includes constituent material accommodating portions 1210*a*, and a supply material including raw materials of the three-dimensionally formed object 500 (a paste-like constituent material including metal particles (constituent material particles)), which is formed using the forming apparatus 2000 according to the embodiment, is accommodated in the constituent material accommodating portions 1210*a*. Each of the constituent material accommodating portions 1210*a* is connected to each of the constituent material ejecting portions 1230 through the supply tube 1220. In this way, by including each of the constituent material accommodating portions 1210*a*, the constituent material supply unit 1210 can supply different kinds of materials through the head base 1100.

As shown in FIGS. 2A and 2B, the support portion-forming material ejecting portion 1230' is connected to a support portion-forming material supply unit 1210' through a supply tube 1220', the support portion-forming material supply unit 1210' accommodating the support portion-forming material and corresponding to each of the head units 1400' which are held in the head base 1100'. A predetermined support portion-forming material is supplied from the support portion-forming material supply unit 1210' to the support portion-forming material ejecting portion 1230'. The support portion-forming material supply unit 1210' includes support portion-forming material accommodating portions 1210*a*', and a supply material including the support portion-forming material which forms the support portion during the formation of the three-dimensionally formed object 500 (a paste-like support portion-forming material including ceramic particles (support portion-forming particles)) is accommodated in the support portion-forming material accommodating portions 1210*a*'. Each of the support portion-forming material accommodating portions 1210*a*' is connected to each of the support portion-forming material ejecting portions 1230' through the supply tube 1220'. In this way, by including each of the support portion-forming material accommodating portions 1210*a*', the support portion-forming material supply unit 1210' can supply different kinds of support portion-forming materials through the head base 1100'.

As the constituent material, for example, a slurry-like (or paste-like) mixed material including a single powder or a mixed powder, a solvent, and a binder can be used, in which examples of the single powder include powders of magnesium (Mg), iron (Fe), cobalt (Co), chromium (Cr), aluminum (Al), titanium (Ti), copper (Cu), and nickel (Ni), and examples of the mixed powder include powders of alloys including one or more of the above-described metals (maraging steel, stainless steel, cobalt-chromium-molybdenum, titanium alloys, nickel alloys, aluminum alloys, cobalt alloys, and cobalt-chromium alloys).

In addition, a general engineering plastic such as polyamide, polyacetal, polycarbonate, modified polyphenyl ether, polybutylene terephthalate, or polyethylene terephthalate can be used. Further, an engineering plastic such as polysulfone, polyether sulfone, polyphenylene sulfide, polyarylate, polyimide, polyamide imide, polyether imide, or polyether ether ketone can be used.

In this way, as the constituent material, for example, a metal other than the above-described metals, a ceramic, or a resin can be used without any particular limitation.

Examples of the solvent include: water; (poly)alkylene glycol monoalkyl ethers such as ethylene glycol monomethyl ether, ethylene glycol monoethyl ether, propylene glycol monomethyl ether, or propylene glycol monoethyl ether; acetates such as ethyl acetate, n-propyl acetate, isopropyl acetate, n-butyl acetate, or isobutyl acetate; aromatic hydrocarbons such as benzene, toluene, or xylene; ketones such as methyl ethyl ketone, acetone, methyl isobutyl ketone, ethyl-n-butyl ketone, diisopropyl ketone, or acetyl acetone; alcohols such as ethanol, propanol, or butanol; tetraalkylammonium acetates; sulfoxide solvents such as dimethyl sulfoxide or diethyl sulfoxide; pyridine solvents such as pyridine, γ-picoline, or 2,6-lutidine; and ionic liquids of tetraalkylammonium acetates (for example, tetrabutylammonium acetate). One kind or a combination of two or more kinds selected from the above examples can be used.

Examples of the binder include: synthetic resins such as an acrylic resin, an epoxy resin, a silicone resin, or a cellulose resin; and thermoplastic resins such as polylactic acid (PLA), polyamide (PA), or polyphenylene sulfide (PPS).

In the embodiment, the support portion-forming material includes a ceramic. As the support portion-forming material, for example, a slurry-like (or paste-like) mixed material can be used, the mixed material including a mixed powder of a metal oxide, a metal alkoxide, a metal, and the like, a solvent, and a binder.

However, the support portion-forming material is not particularly limited, and a metal or a resin other than ceramics described in the above-described examples of constituent material can be used.

The forming apparatus 2000 includes a control unit 400 which controls the stage 120, the constituent material ejecting portions 1230 included in the constituent material supply device 1200, the heating portion 1700, and the support portion-forming material ejecting portions 1230' included in the support portion-forming material supply device 1200' based on data for forming a three-dimensionally formed object which is output from a data output device (not shown) such as a personal computer. The control unit 400 includes a control portion (not shown) which controls the stage 120 and the constituent material ejecting portion 1230 to be driven and operate in cooperation with each other and controls the stage 120 and the support portion-forming material supply device 1200' to be driven and operate in cooperation with each other.

Regarding the stage 120 which is provided to be movable on the base 110, based on control signals output from the control unit 400, signals for controlling, for example, the moving start and stop, a moving direction, a moving amount, and a moving speed of the stage 120 are generated by a stage controller 410, and the stage 120 is transported to the driving device 111 included in the base 110 and moves in the X, Y, and Z directions shown in the drawings. Regarding the constituent material ejecting portions 1230 included in the head units 1400, based on control signals output from the control unit 400, signals for controlling, for example, the amount of the material ejected through the ejection nozzles 1230*a* by the ejection driving portions 1230*b* included in the constituent material ejecting portions 1230 are generated by the material supply controller 1500, and a predetermined amount of the constituent material is ejected through the ejection nozzles 1230*a* based on the generated signals.

Likewise, regarding the support portion-forming material ejecting portions 1230' included in the head units 1400', based on control signals output from the control unit 400, signals for controlling, for example, the amount of the material ejected through the ejection nozzles 1230*a*' by the ejection driving portions 1230*b*' included in the support portion-forming material ejecting portions 1230' are generated by the material supply controller 1500, and a predetermined amount of the support portion-forming material is ejected through the ejection nozzles 1230*a*' based on the generated signals.

Regarding the heating portion 1700, a control signal is output from the control unit 400 to the heating portion controller 1710, and an output signal for irradiating electromagnetic waves is output from the heating portion controller 1710 to the heating portion 1700.

Next, the head units 1400 will be described in more detail. The head unit 1400' has the same configuration as that of the head unit 1400, except that the support portion-forming material ejecting portions 1230' are disposed in the same configuration instead of the constituent material ejecting portions 1230. Therefore, the detailed configuration of the head unit 1400' will be omitted.

Figure 3:
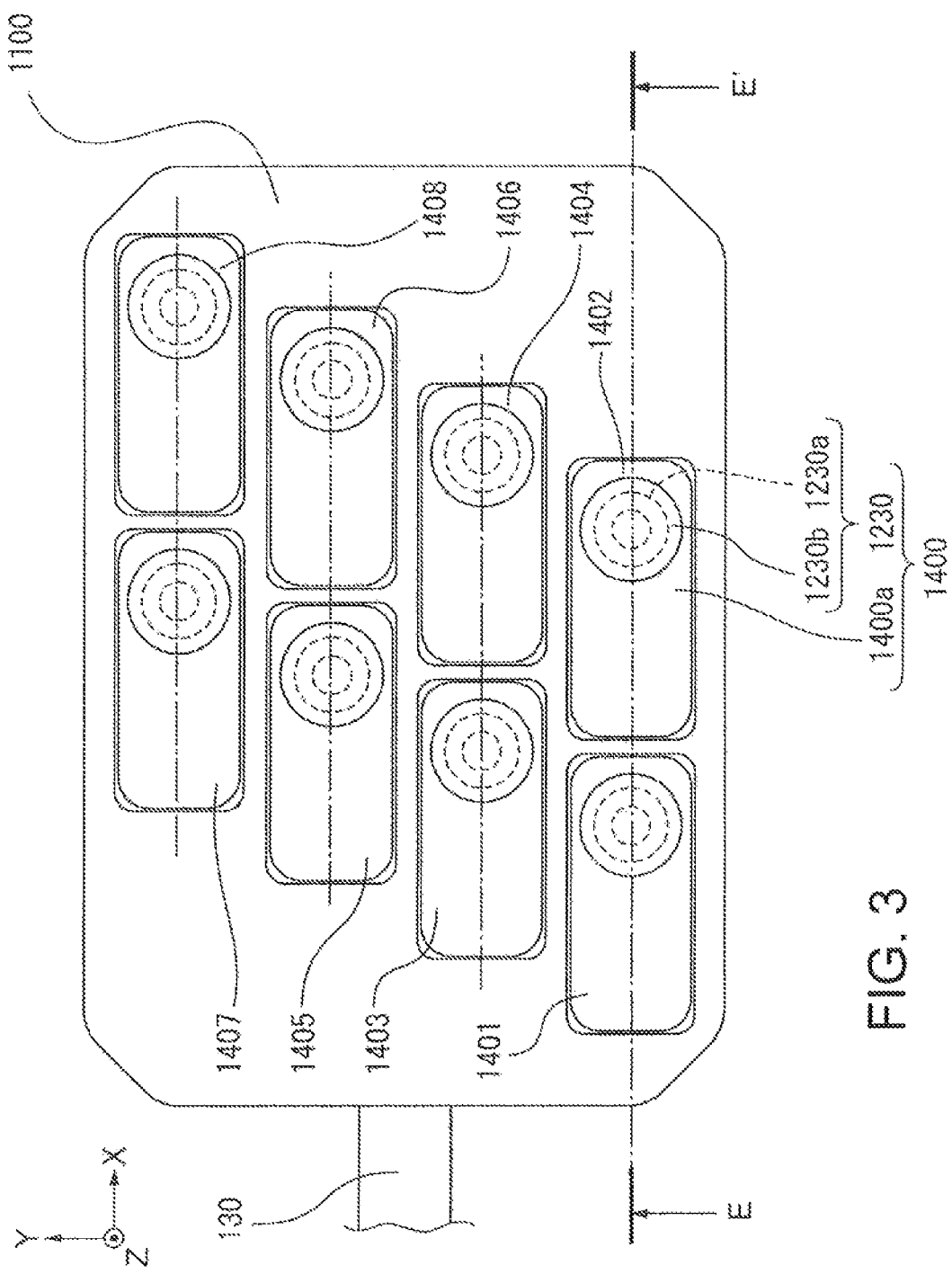
FIG. 3 is a diagram showing the external appearance of a head base according to the embodiment of the invention when seen from a D direction shown in FIG. 1B.
Figure 4:
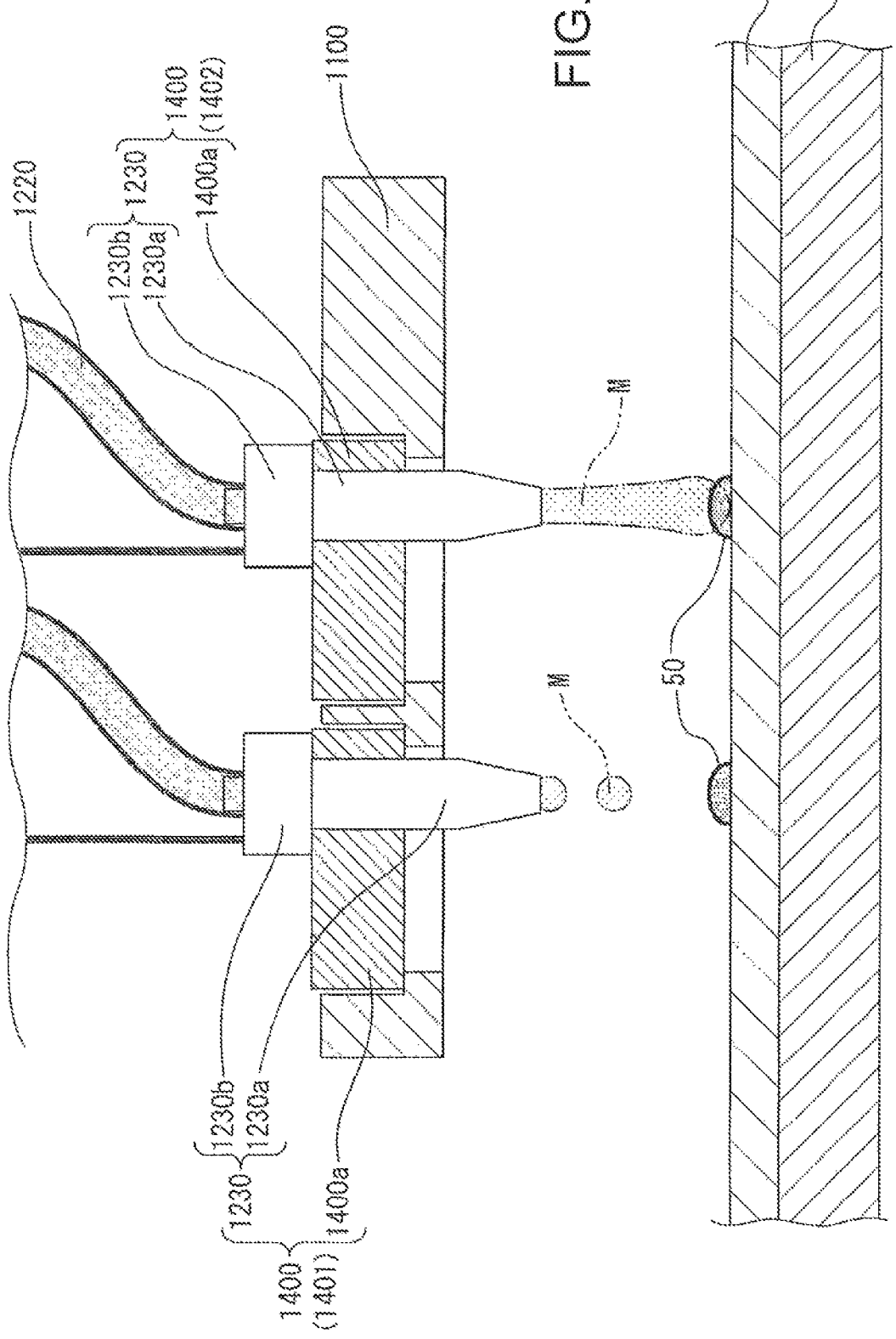
FIG. 4 is a cross-sectional view taken along line E-E' shown in FIG. 3.

FIGS. 3 and 4 show examples of a state where the head units 1400 are held in the head base 1100 and a state where the constituent material ejecting portions 1230 are held in each of the head units 1400. FIG. 3 is a diagram showing the external appearance of the head base 1100 when seen from a direction D shown in FIG. 1B. FIG. 4 is a schematic cross-sectional view taken along line E-E' shown in FIG. 3.

As shown in FIG. 3, in the head base 1100, the plural head units 1400 are held by a fixing unit (not shown). The head base 1100 of the forming apparatus 2000 according to the embodiment includes eight head units 1400 including, from below in the drawing, head units 1401 and 1402 on a first line, head units 1403 and 1404 on a second line, head units 1405 and 1406 on a third line, and head units 1407 and 1408 on a fourth line. Although not shown in the drawing, the constituent material ejecting portions 1230 included in each of the head units 1401 to 1408 are connected to the constituent material supply unit 1210 through the ejection driving portions 1230*b* and the supply tubes 1220 and are held by the holding jigs 1400*a*.

As shown in FIG. 4, the constituent material ejecting portions 1230 eject a material M, which is the constituent material of the three-dimensionally formed object, to the sample plate 121, which is mounted on the stage 120, through the ejection nozzles 1230*a*. The head unit 1401 ejects the material M, for example, in the form of liquid drops, and the head unit 1402 ejects the material M, for example, in the form of a continuous body. In the forming apparatus 2000 according to the embodiment, the material M is ejected in the form of liquid drops. However, the ejection nozzles 1230*a* can supply the constituent material in the form of a continuous body.

The material M ejected through the ejection nozzles 1230*a* in the form of liquid drops flies substantially in the gravity direction and lands on the sample plate 121. The landed material M forms landed portions 50. An aggregate of the landed portions 50 is formed as the constituent layer 310 (refer to FIGS. 1A and 1B) of the three-dimensionally formed object 500 formed on the sample plate 121.

Figure 5A:
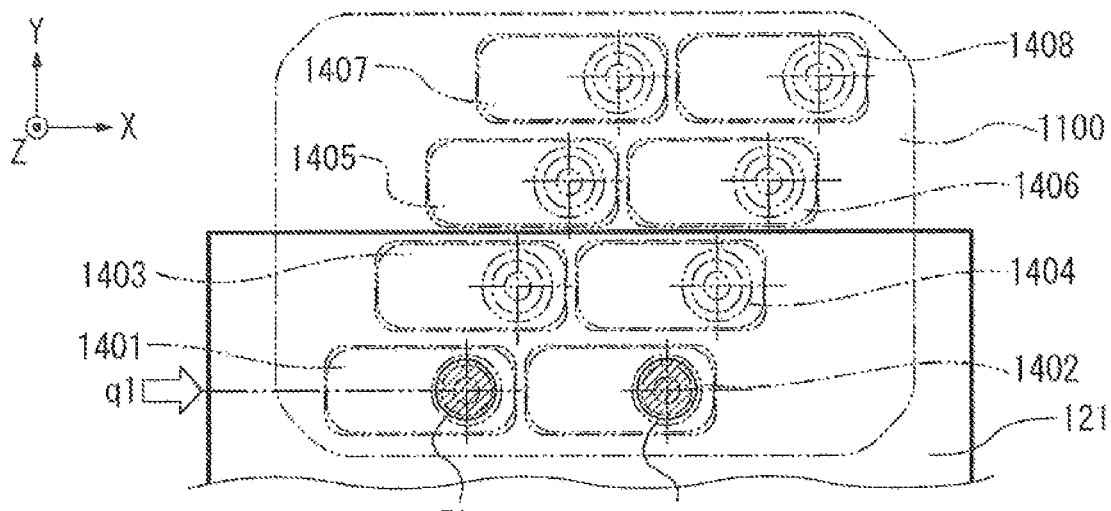
FIGS. 5A to 5C are plan views schematically showing a relationship between a disposition of head units according to the embodiment of the invention and a formed state of landed portions.

FIGS. 5A to 7 are plan views (when seen from the D direction shown in FIGS. 1A and 1B) schematically showing a relationship between a disposition of the head units 1400 and a formed state of the landed portions 50. First, as shown in FIG. 5A, at a forming start point q1 on the sample plate 121, the material M is ejected through the ejection nozzles 1230*a* of the head units 1401 and 1402 and lands on the sample plate 121 to form landed portions 50*a* and 50*b*. For convenience of description, the landed portions 50 are hatched in a plan view, and the constituent layer 310 of the first layer 501 formed on the top surface of the sample plate 121 will be described as an example.

First, as shown in FIG. 5A, at the forming start point q1 of the constituent layer 310 of the layer 501 on the sample plate 121, the material M is ejected through the constituent material ejecting portions 1230 included in the head units 1401 and 1402 on the first line from below in the drawing. The ejected material M forms the landed portions 50a and 50b.

Figure 5B:
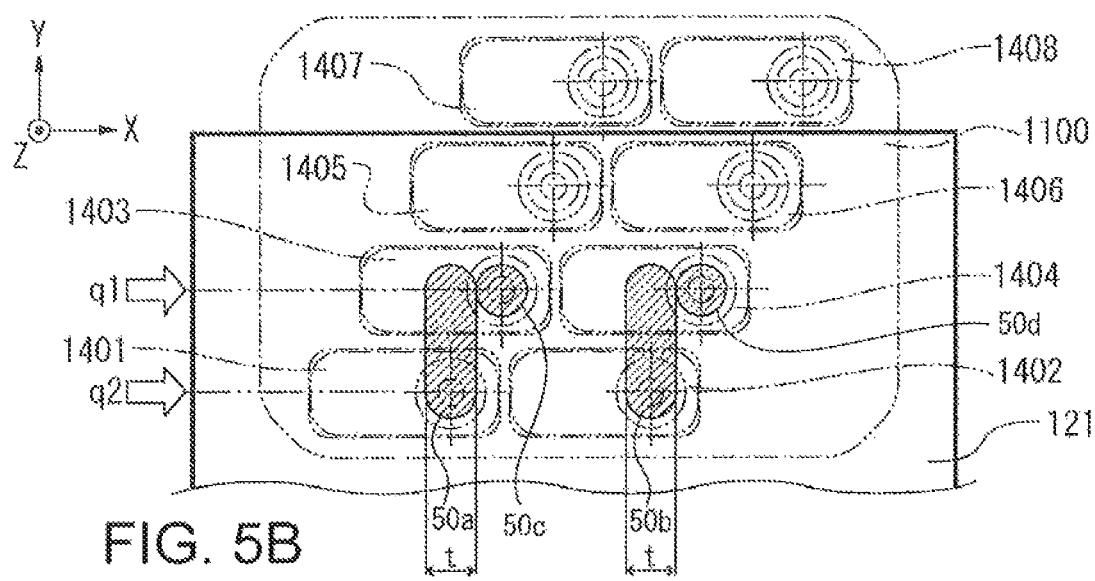

While continuously ejecting the material M through the constituent material ejecting portions 1230 of the head units 1401 and 1402, the sample plate 121 is moved in the Y (+) direction relative to the head base 1100 such that the forming start point q1 shown in FIG. 5B is positioned at a position corresponding to the head units 1403 and 1404 on the second line. As a result, the landed portions 50a and 50b extend while maintaining a width t ranging from the forming start point q1 to a position q2 after the relative movement of the sample plate 121. Further, the material M is ejected from the head units 1403 and 1404 on the second line corresponding to the forming start point q1 and starts to form landed portions 50c and 50d.

Figure 5C:
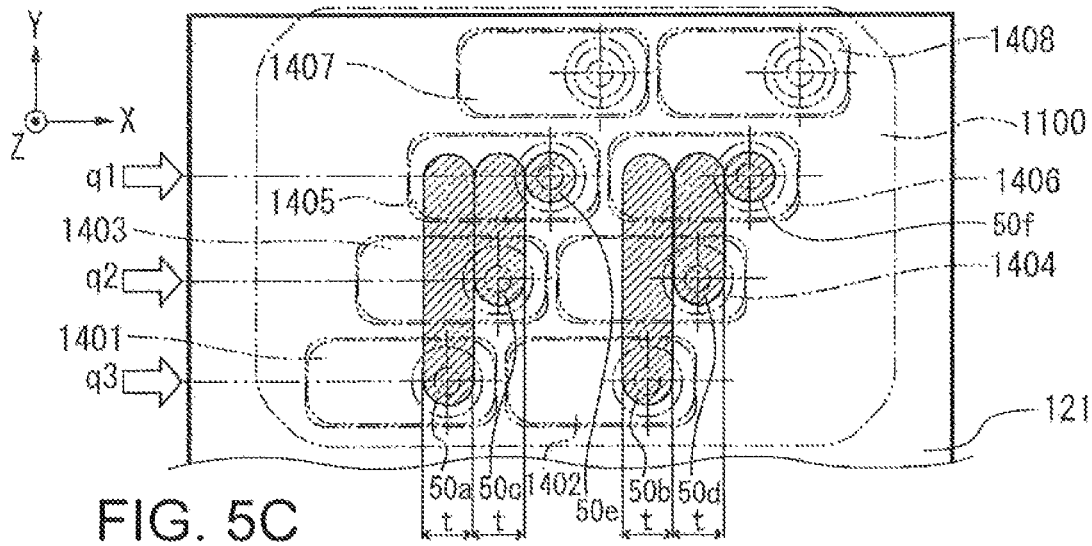

As shown in FIG. 5B, the landed portions 50c and 50d are started to be formed, and while continuously ejecting the material M through the constituent material ejecting portions 1230 of the head units 1403 and 1404, the sample plate 121 is moved in the Y (+) direction relative to the head base 1100 such that the forming start point q1 shown in FIG. 5C is positioned at a position corresponding to the head units 1405 and 1406 on the third line. As a result, the landed portions 50c and 50d extend while maintaining the width t ranging from the forming start point q1 to the position q2 after the relative movement of the sample plate 121. Concurrently, the landed portions 50a and 50b extend while maintaining the width t ranging from the forming start point q1 to a position q3 after the relative movement of the sample plate 121. The material M is ejected from the head units 1405 and 1406 on the third line corresponding to the forming start point q1 and starts to form landed portions 50e and 50f.

Figure 6A:
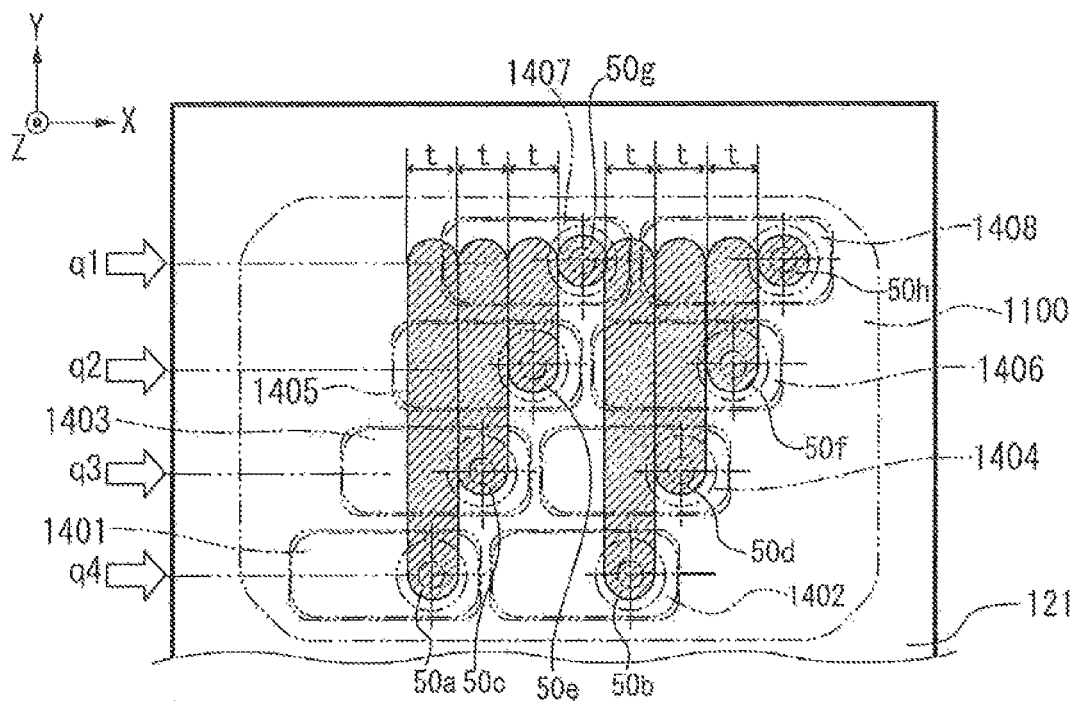
FIGS. 6A and 6B are plan views schematically showing a relationship between a disposition of head units according to the embodiment of the invention and a formed state of landed portions.

As shown in FIG. 5C, the landed portions 50e and 50f are started to be formed, and while continuously ejecting the material M through the constituent material ejecting portions 1230 of the head units 1405 and 1406, the sample plate 121 is moved in the Y (+) direction relative to the head base 1100 such that the forming start point q1 shown in FIG. 6A is positioned at a position corresponding to the head units 1407 and 1408 on the fourth line. As a result, the landed portions 50e and 50f extend while maintaining the width t ranging from the forming start point q1 to the position q2 after the relative movement of the sample plate 121. Concurrently, the landed portions 50a and 50b extend while maintaining the width t ranging from the forming start point q1 to a position q4 after the relative movement of the sample plate 121, and the landed portions 50c and 50d extend while maintaining the width t ranging from the forming start point q1 to the position q3 after the relative movement of the sample plate 121. The material M is ejected from the head units 1407 and 1408 on the fourth line corresponding to the forming start point q1 and starts to form landed portions 50g and 50h.

Figure 6B:
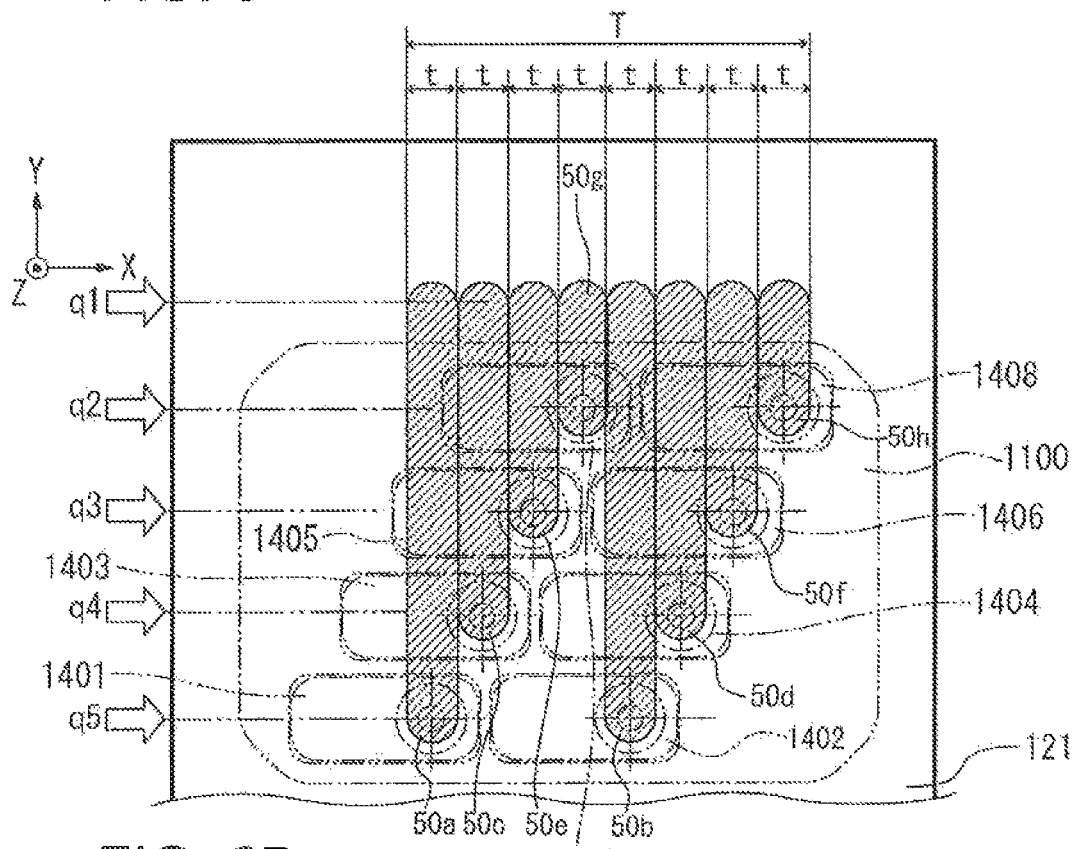
Figure 7:
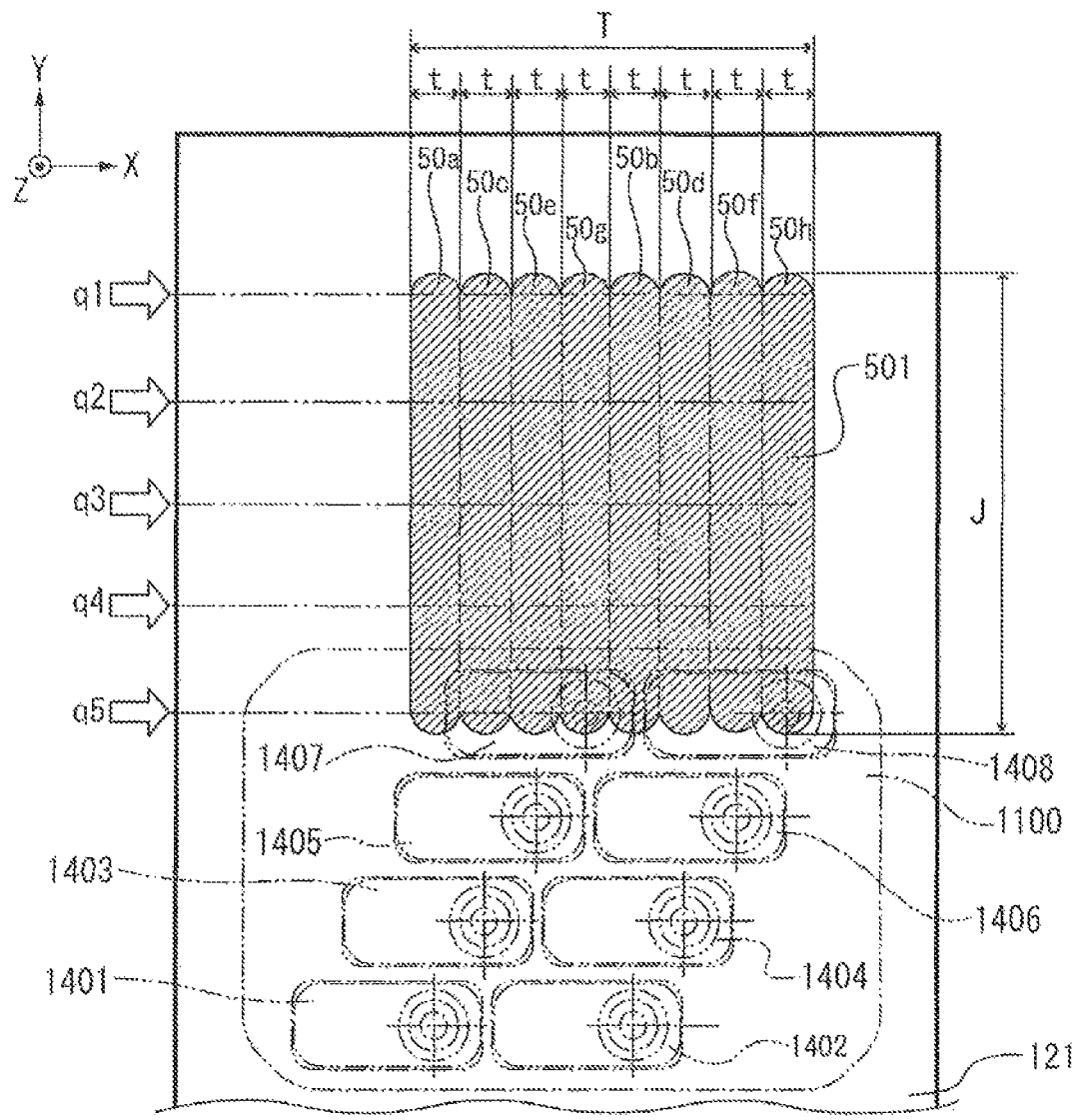
FIG. 7 is a plan view schematically showing a relationship between a disposition of head units according to the embodiment of the invention and a formed state of landed portions.

In a case where a position q5 is set as a forming end point (hereinafter, the position q5 will be referred to as "forming end point q5"), as shown in FIG. 6B, the sample plate 121 is relatively moved until the head units 1401 and 1402 reach the forming end point q5 such that the landed portions 50g and 50h extend. In the head units 1401 and 1402 which have reached the forming end point q5, the ejection of the material M through the constituent material ejecting portions 1230 of the head units 1401 and 1402 is stopped. Further, while relatively moving the sample plate 121 in the Y (+) direction, the material M is ejected through the constituent material ejecting portions 1230 until the head units 1403, 1404, 1405, 1406, 1407, and 1408 reach the forming end point q5. As a result, as shown in FIG. 7, the landed portions 50a, 50b, 50c, 50d, 50e, 50f, 50g, and 50h are formed in the region from the forming start point q1 to the forming endpoint q5 while maintaining the width t. In this way, while moving the sample plate 121 from the forming start point q1 to the forming end point q5, the material M is ejected and supplied from the head units 1401, 1402, 1403, 1404, 1405, 1406, 1407, and 1408 in this order. As a result, in this embodiment, a substantially rectangular aggregate of the landed portions 50 having a width T and a length J can be formed. In this way, the constituent layer 310 of the first layer 501 which is the aggregate of the landed portions 50 can be formed.

As described above, in the forming apparatus 2000 according to the embodiment, in synchronization with the movement of the stage 120 including the sample plate 121, the materials M is selectively ejected and supplied through the constituent material ejecting portions 1230 included in the head units 1401, 1402, 1403, 1404, 1405, 1406, 1407, and 1408. As a result, the constituent layer 310 having a desired shape can be formed on the sample plate 121. In addition, as described above, in this example, by simply moving the stage 120 in a single direction along the Y axis direction, the landed portions 50 having a desired shape can be formed in the region having the width T and the length J shown in FIG. 7, and further the constituent layer 310 which is the aggregate of the landed portions 50 can be formed therein.

In addition, regarding the material M ejected through the constituent material ejecting portions 1230, a constituent material ejected and supplied from one unit or two or more units among the head units 1401, 1402, 1403, 1404, 1405, 1406, 1407, and 1408 may be different from a constituent material ejected and supplied from the other units. Accordingly, by using the forming apparatus 2000 according to the embodiment, a three-dimensionally formed object formed of different materials can be formed.

In the first layer 501, as described above, the support layer 300 can be formed using the same method as described above by ejecting the support portion-forming material through the support portion-forming material ejecting portions 1230' before or after the formation of the constituent layer 310. When the layers 502, 503, . . . , and 50n are formed by being laminated on the layer 501, the constituent layers 310 and the support layers 300 can be formed using the same method as described above.

Figure 8A:
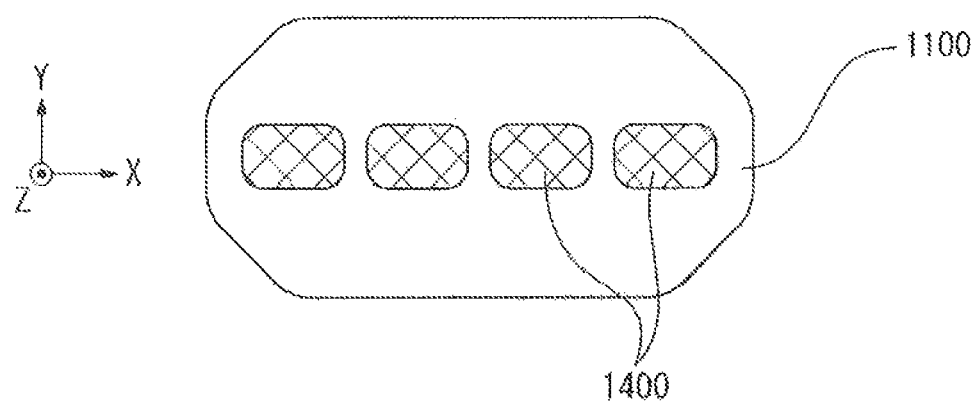
FIGS. 8A and 8B are diagrams schematically showing other disposition examples of head units disposed on the head base.
Figure 8B:
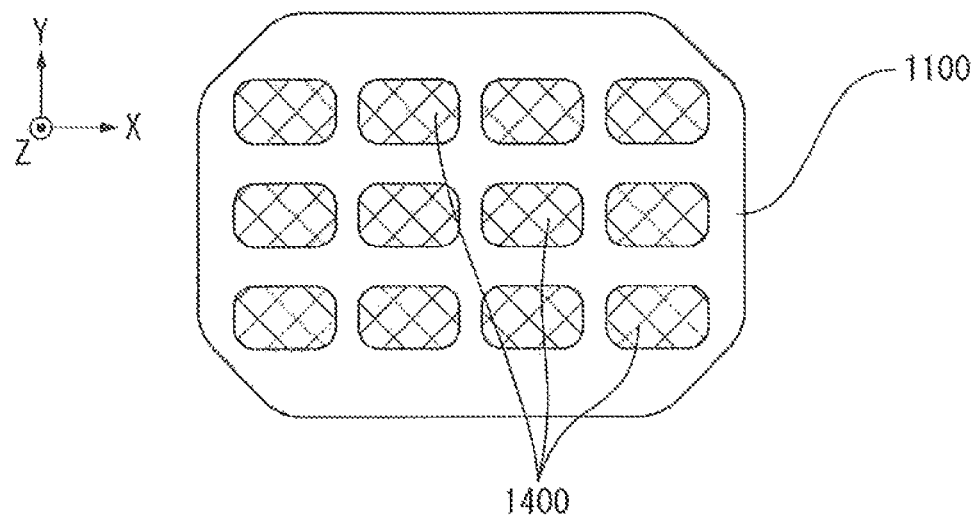

The numbers and dispositions of the head units 1400 and the 1400' included in the forming apparatus 2000 according to the embodiment are not limited to the above-described numbers and dispositions. FIGS. 8A and 8B are diagrams schematically showing other disposition examples of the head units 1400 disposed on the head base 1100.

FIG. 8A shows a state where the plural head units 1400 are provided in parallel in the X axis direction in the head base 1100. FIG. 8B shows a state where the plural head units 1400 are provided in a lattice shape in the head base 1100. The number of head units disposed is not limited to that of each of the examples shown in FIGS. 8A and 8B.

Next, an example in which a method of manufacturing a three-dimensionally formed object is performed using the forming apparatus 2000 according to the embodiment will be described.

FIGS. 9A to 9H are diagrams schematically showing an example of a process of manufacturing a three-dimensionally formed object which is performed using the forming apparatus 2000. In the method of manufacturing a three-dimensionally formed object according to the example, whenever a single layer is formed by ejecting the constituent material and the support portion-forming material through the constituent material ejecting portions 1230 and the support portion-forming material ejecting portions 1230', the layer is heated using the heating portion 1700 included in the forming apparatus 2000. In addition, in the method of manufacturing a three-dimensionally formed object according to the example, a molten three-dimensionally formed object is manufactured.

In FIGS. 9A to 9H, plural auxiliary lines are drawn in the Z direction such that the thicknesses of the support layer 300 and the constituent layer 310 can be easily recognized.

First, as shown in FIG. 9A, the constituent layer 310 and the support layer 300 are formed in the first layer 501 by ejecting the constituent material through the constituent material ejecting portions 1230 and ejecting the support portion-forming material through the support portion-forming material ejecting portions 1230'. Here, the support layer 300 is formed in regions of the layer excluding a region where the three-dimensionally formed object is formed (a region corresponding to the constituent layer 310).

Next, as shown in FIG. 9B, the first layer 501 is heated by the heating portion 1700 such that the constituent layer 310 is melted and the support layer 300 is sintered in the layer 501. In the example, the heating temperature of the heating portion 1700 is set as a temperature (the melting point or higher) at which metal particles (constituent material particles) included in the constituent material are melted and a temperature (lower than the melting point) at which ceramic particles (support portion-forming particles) included in the support portion-forming material are sintered.

Hereinafter, the operation shown in FIG. 9A and the operation shown in FIG. 9B are repeated, thereby completing a three-dimensionally formed object.

Specifically, as shown in FIG. 9C, the constituent layer 310 and the support layer 300 are formed in the second layer 502 by ejecting the constituent material through the constituent material ejecting portions 1230 and ejecting the support portion-forming material through the support portion-forming material ejecting portions 1230'. As shown in FIG. 9D, the second layer 502 is heated by the heating portion 1700.

Further, as shown in FIG. 9E, the constituent layer 310 and the support layer 300 are formed in the third layer 503. As shown in FIG. 9F, the third layer 503 is heated by the heating portion 1700. As shown in FIG. 9G, the constituent layer 310 and the support layer 300 are formed in the fourth layer 504. As shown in FIG. 9H, the fourth layer 504 is heated by the heating portion 1700. As a result, a three-dimensionally formed object (molten constituent layer 310) is completed.

Next, the method of manufacturing a three-dimensionally formed object according to the example shown in FIGS. 9A to 9H will be described using a flowchart.

Figure 10:
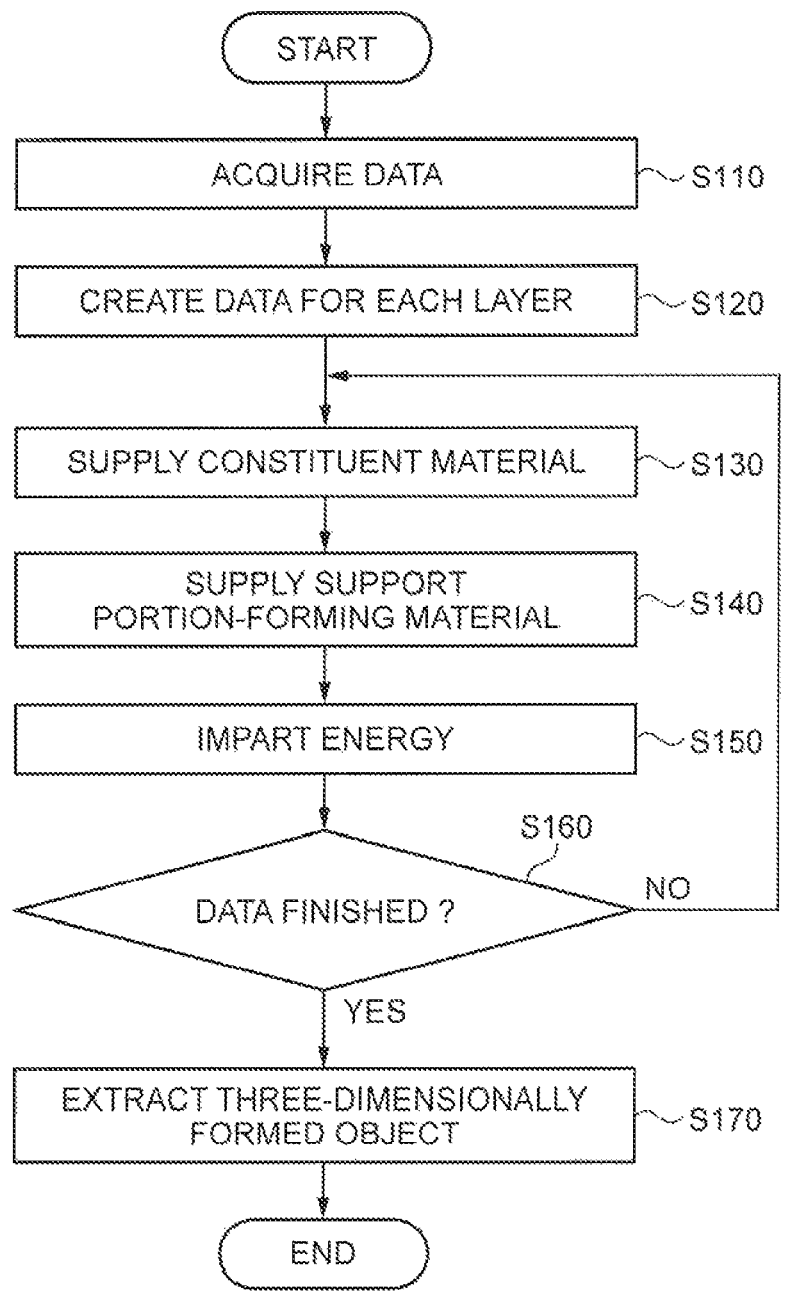
FIG. 10 is a flowchart showing the method of manufacturing a three-dimensionally formed object according to the example of the invention.

Here, FIG. 10 is the flowchart showing the method of manufacturing a three-dimensionally formed object.

As shown in FIG. 10, in the method of manufacturing a three-dimensionally formed object according to the example, firstly, data of a three-dimensionally formed object is acquired in Step S110. Specifically, for example, data representing the shape of the three-dimensionally formed object is acquired from, for example, an application program which is performed by a personal computer.

Next, in Step S120, data for each layer is created. Specifically, in the data representing the shape of the three-dimensionally formed object, bitmap data (cross-sectional data) is generated for each of cross-sections which are obtained by slicing the three-dimensionally formed object according to a forming resolution in the Z direction.

At this time, in the generated bitmap data, a region where the three-dimensionally formed object is formed is distinguished from regions where the three-dimensionally formed object is not formed.

Next, in Step S130, the constituent material is ejected (supplied) through the constituent material ejecting portions 1230 based on the data for forming the region where the three-dimensionally formed object is formed. As a result, the constituent layer 310 is formed.

Next, in Step S140, the support portion-forming material is ejected (supplied) through the support portion-forming material ejecting portions 1230' based on the data for forming the regions where the three-dimensionally formed object is not formed. As a result, the support layer 300 is formed on the same layer as that on which the constituent layer 310 is formed in Step S130.

The order of performing Step S130 and Step S140 may be reversed, or Step S130 and Step S140 may be performed at the same time.

Next, in Step S150, the layer on which the constituent layer 310 is formed in Step S130 and on which the support layer 300 is formed in Step S140 is irradiated (imparted with heat energy) with electromagnetic waves by the heating portion 1700. As a result, in this layer, the constituent layer 310 is melted, and the support layer 300 is sintered.

In this step, the constituent layer 310 is melted, and the support layer 300 is sintered. However, the support layer 300 is not necessarily sintered.

In Step S160, whether or not the formation of the three-dimensionally formed object is finished is determined based on the bitmap data corresponding to each of the layers which are generated in Step S120, and Steps S130 to S160 are repeated until the formation of the three-dimensionally formed object is finished.

Once the formation of the three-dimensionally formed object is finished, in Step S170, the three-dimensionally formed object is extracted (the regions corresponding to the support layer 300, which are the regions where the three-dimensionally formed object is not formed, are removed from the layer to obtain the region corresponding to the constituent layer 310 which is the region where the three-dimensionally formed object is formed; that is, the three-dimensionally formed object is cleaned). As a result, the method of manufacturing a three-dimensionally formed object according to the example ends.

Next, another example in which a method of manufacturing a three-dimensionally formed object is performed using the forming apparatus 2000 according to the embodiment will be described.

FIGS. 11A to 11E are diagrams schematically showing another example of a process of manufacturing a three-dimensionally formed object which is performed using the forming apparatus 2000. In the method of manufacturing a three-dimensionally formed object according to the example, after the formation of a shape of a three-dimensionally formed object is finished by ejecting the constituent material and the support portion-forming material through the constituent material ejecting portions 1230 and the support portion-forming material ejecting portions 1230', the shaped product of the three-dimensionally formed object is heated in a thermostatic chamber (heating portion) (not shown), which is provided separately from the forming apparatus 2000, without using the heating portion 1700 included in the forming apparatus 2000. In addition, in the method of manufacturing a three-dimensionally formed object according to the example, a molten three-dimensionally formed object is manufactured.

In FIGS. 11A to 11E, plural auxiliary lines are drawn in the Z direction such that the thicknesses of the support layer 300 and the constituent layer 310 can be easily recognized.

First, as shown in FIG. 11A, the constituent layer 310 and the support layer 300 are formed in the first layer 501 by ejecting the constituent material through the constituent material ejecting portions 1230 and ejecting the support portion-forming material through the support portion-forming material ejecting portions 1230'. Here, the support layer 300 is formed in regions of the layer excluding a region where the three-dimensionally formed object is formed (a region corresponding to the constituent layer 310).

Next, as shown in FIG. 11B, the constituent layer 310 and the support layer 300 are formed in the second layer 502 by ejecting the constituent material through the constituent material ejecting portions 1230 and ejecting the support portion-forming material through the support portion-forming material ejecting portions 1230'.

As shown in FIGS. 11C and 11D, the operations shown in FIGS. 11A and 11B are repeated, thereby completing the shape of the three-dimensionally formed object.

As shown in FIG. 11E, the shaped product of the three-dimensionally formed object is heated in the thermostatic chamber (not shown) such that the constituent layer 310 is melted and the support layer 300 is sintered in the shaped product of the three-dimensionally formed object. As a result, a three-dimensionally formed object (molten constituent layer 310) is completed. In the example, the heating temperature in the thermostatic chamber is set as a temperature (the melting point or higher) at which metal particles (constituent material particles) included in the constituent material are melted and a temperature (lower than the melting point) at which ceramic particles (support portion-forming particles) included in the support portion-forming material are sintered.

Next, the method of manufacturing a three-dimensionally formed object according to the example shown in FIGS. 11A to 11E will be described using a flowchart.

Figure 12:
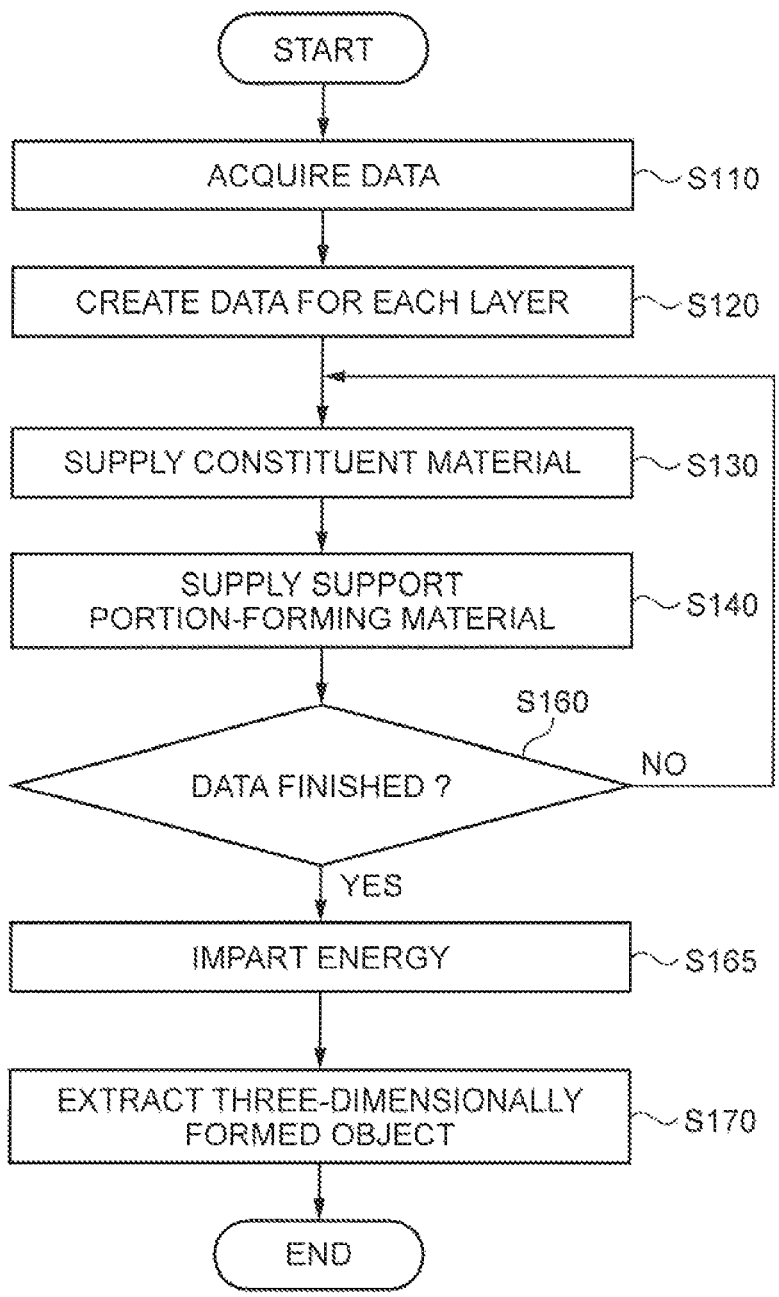
FIG. 12 is a flowchart showing a method of manufacturing a three-dimensionally formed object according to an example of the invention.

Here, FIG. 12 is the flowchart showing the method of manufacturing a three-dimensionally formed object.

Since operations in Steps S110 to S140 and Step S170 of FIG. 12 are the same as those in Steps S110 to S140 and Step S170 of FIG. 10, the description thereof will not be repeated.

As shown in FIG. 12, in the method of manufacturing a three-dimensionally formed object according to the example, the process proceeds to Step S160 after the completion of Step S140.

In Step S160, whether or not the formation of the shaped product of the three-dimensionally formed object is finished is determined based on the bitmap data corresponding to each of the layers which are generated in Step S120, and Steps S130 to S160 are repeated until the formation of the shaped product of the three-dimensionally formed object is finished. Once the formation of the shaped product of the three-dimensionally formed object is finished, the process proceeds to Step S165.

In Step S165, the shaped product of the three-dimensionally formed object, which is formed by repeating the Steps S130 to S160, is heated in the thermostatic chamber (not shown) such that the constituent layer 310 is melted and the support layer 300 is sintered. In this step, the constituent layer 310 is melted, and the support layer 300 is sintered. However, the support layer 300 is not necessarily sintered. After the completion of Step S165, Step S170 is performed. As a result, the method of manufacturing a three-dimensionally formed object according to the example ends.

As can be seen from the above two examples, the method of manufacturing a three-dimensionally formed object according to any one of the examples includes: a layer forming step (Steps S130 and S140) of forming a layer using a fluid composition (constituent material) including constituent material particles of a three-dimensionally formed object and a fluid composition (support portion-forming material) including support portion-forming particles for forming a support portion which supports the three-dimensionally formed object during the formation of the three-dimensionally formed object; and an energy imparting step (Steps S150 and Steps S165) of imparting energy to the constituent material particles and the support portion-forming particles. In the energy imparting step, the energy is imparted such that a temperature of the constituent material particles and a temperature of the support portion-forming particles are equal to or higher than a melting point of the constituent material particles and are lower than a melting point of the support portion-forming particles.

Therefore, the melting of the support portion can be prevented while melting the constituent material of the three-dimensionally formed object. When an extracting operation of extracting the three-dimensionally formed object, a forming operation after the extracting operation, or the like is performed, an increase in load caused by the melting of other regions of the layer excluding the region corresponding to the three-dimensionally formed object can be prevented. Accordingly, the number of steps performed after a three-dimensionally formed object is formed can be reduced.

In other words, the three-dimensionally formed object manufacturing apparatus (forming apparatus 2000) according to any one of the examples includes: an ejecting portion (constituent material ejecting portion 1230) that ejects a fluid composition (constituent material) including constituent material particles of a three-dimensionally formed object; an ejecting portion (support portion-forming material ejecting portion 1230') that ejects a fluid composition (support portion-forming material) including support portion-forming particles for forming a support portion which supports the three-dimensionally formed object during the formation of the three-dimensionally formed object; a control portion (control unit 400) that controls the three-dimensionally formed object manufacturing apparatus to form a layer using the fluid composition including the constituent material particles and the fluid composition including the support portion-forming particles; and an energy imparting portion (heating portion 1700) that imparts energy to the constituent material particles and the support portion-forming particles. The energy imparting portion is adjusted to impart the energy such that a temperature of the constituent material particles and a temperature of the support portion-forming particles are equal to or higher than a melting point of the constituent material particles and are lower than a melting point of the support portion-forming particles.

Therefore, the melting of the support portion can be prevented while melting the constituent material of the three-dimensionally formed object. When an extracting operation of extracting the three-dimensionally formed object, a forming operation after the extracting operation, or the like is performed, an increase in load caused by the melting of other regions of the layer excluding the region corresponding to the three-dimensionally formed object can be prevented. Accordingly, the number of steps performed after a three-dimensionally formed object is formed can be reduced.

In the method of manufacturing a three-dimensionally formed object according to any one of the examples, in the layer forming step (Steps S130 and S140), the fluid composition including the constituent material particles and the fluid composition including the support portion-forming particles are ejected in the form of liquid drops to form the layer. Therefore, using a simple method of forming the layer, the three-dimensionally formed object can be formed.

In addition, the method of manufacturing a three-dimensionally formed object according to any one of the examples includes a laminating step (Steps S130 to S160) of repeating the layer forming step (Steps S130 and S140). Therefore, by repeating the layer forming step, the three-dimensionally formed object can be simply formed.

In addition, in the method of manufacturing a three-dimensionally formed object according to any one of the examples, in the energy imparting step (Steps S150 and S165), the energy is imparted such that a temperature of the constituent material particles and a temperature of the support portion-forming particles are equal to or higher than a sintering temperature of the support portion-forming particles. That is, the constituent material particles are melted, and the support portion-forming particles are sintered. Since the sintering portion can be simply separated from the melting portion, the number of steps performed after a three-dimensionally formed object is formed can be reduced.

In addition, in the method of manufacturing a three-dimensionally formed object according to any one of the examples, the layer forming step (Steps S130 and S140) is adjusted such that a thickness of a layer including the constituent material particles and a thickness of a layer including the support portion-forming particles which correspond to the layer match with each other after the energy imparting step (Steps S150 and S165). Specifically, a change (reduction degree) in the thickness of the constituent layer caused by melting and a change (reduction degree) in the thickness of the support layer caused by sintering are calculated in advance, and a difference between the changes of the two layers is calculated to adjust the thickness of each of the layers (the amount of liquid drops ejected). Therefore, since there is no difference in the thickness between the support layer and the constituent layer, it is not necessary to adjust the thicknesses of the layers, and a high-precision three-dimensionally formed object can be manufactured.

In addition, in the method of manufacturing a three-dimensionally formed object according to the example shown in FIG. 10, the energy imparting step (Step S150) is performed whenever the laminating step (Steps S130 to Steps S160) is performed once to form a layer. In addition, in the method of manufacturing a three-dimensionally formed object according to the example shown in FIG. 12, the energy imparting step (Step S165) is performed after completion of the laminating step (Steps S130 to Steps S160). In other words, in the method of manufacturing a three-dimensionally formed object according to any one of the examples, the energy imparting step is performed after performing the layer forming step (Steps S130 and S140) once or multiple times to form one layer or plural layers. For example, by performing the energy imparting step after performing the layer forming step multiple times to form plural layers, the number of times of performing the constituent layer forming step can be reduced, and a three-dimensionally formed object can be rapidly manufactured. By performing the energy imparting step once to form a layer, even in a case where one material is disposed to cover the other material on an inclined surface or the like, the two materials are exposed to the same surface in each of the layers, and thus energy can be appropriately imparted to each of the materials.

In addition, in the method of manufacturing a three-dimensionally formed object according to any one of the examples, in the energy imparting step (Steps S150 and S165), the same intensity of energy is imparted to the constituent material particles and the support portion-forming particles (the constituent material particles and the support portion-forming particles are irradiated with electromagnetic waves by the heating portion 1700 in Step S150, and the constituent material particles and the support portion-forming particles are collectively heated in the thermostatic chamber (not shown) in Step S165). Therefore, the energy imparting step can be simply performed.

In the energy imparting step, different intensities of energy may be imparted to the constituent material particles and the support portion-forming particles. By imparting different intensities of energy, melting or excessive sintering of other regions of the layer excluding the region corresponding to the three-dimensionally formed object can be effectively prevented, and when an extracting operation of extracting the three-dimensionally formed object, a forming operation after the extracting operation, or the like is performed, an increase in load can be prevented.

In addition, in the method of manufacturing a three-dimensionally formed object according to any one of the examples, a porosity of a layer including the constituent material particles is lower than a porosity of a layer including the support portion-forming particles which corresponds to the layer after the energy imparting step (Steps S150 and S165). Therefore, when an extracting operation of extracting the three-dimensionally formed object, a forming operation after the extracting operation, or the like is performed, an increase in load caused by an excessively low porosity of the layer including the support portion-forming particles can be prevented.

In addition, in the method of manufacturing a three-dimensionally formed object according to any one of the examples, a porosity of a layer including the support portion-forming particle after the energy imparting step (Steps S150 and S165) is adjusted to be lower than that before the energy imparting step. Therefore, the strength of the support portion is improved, and there is an advantageous effect in that, before an extracting operation of extracting a three-dimensionally formed object, the three-dimensionally formed object can be reliably held.

In addition, it is preferable that the constituent material particles include at least one component of aluminum, titanium, iron, copper, magnesium, stainless steel, or maraging steel and that the support portion-forming particles include at least one component of silica, alumina, titanium oxide, or zirconium oxide. In the energy imparting step, the constituent material particles can be easily controlled to be melted, and the support portion-forming particles can be controlled to have a low sintered density. While securing the strength of the three-dimensionally formed object, an increase in the load of an extracting operation of extracting the three-dimensionally formed object, a forming operation after the extracting operation, or the like can be prevented.

The invention is not limited to the above-described examples and can be realized in various embodiments within a range not departing from the scope of the invention. For example, the technical features of any one of the examples corresponding to the technical features of any one of the embodiments described in "Summary" can be appropriately replaced or combined in order to solve a part or all of the above-described problems or to achieve a part or all of the above-described effects. In addition, the technical features may be appropriately omitted unless they are described as essential features in this specification.

The present application is a continuation of U.S. patent application Ser. No. 15/292,005, filed Oct. 12, 2016, which claims priority to Japanese Patent Application No. 2015-203487, filed Oct. 15, 2015, the entire disclosures of which are expressly incorporated by reference herein.

What is claimed is:

1. A method of manufacturing a three-dimensionally formed object, the method comprising:

forming a plurality of layers, each of the layers of the plurality of layers being formed using at least one of a first flowable composition including constituent material particles for forming the three-dimensionally formed object ejected from a first ejection nozzle or a second flowable composition including support portion-forming particles for forming a support portion which supports the three-dimensionally formed object during the formation of the three-dimensionally formed object ejected from a second ejection nozzle, the first ejection nozzle ejecting the first flowable composition in the form of a continuous body to form an object area having a first predetermined thickness on a per layer basis, and the second ejection nozzle ejecting the second flowable composition in the form of a continuous body to form a support area having a second predetermined thickness on a per layer basis; and imparting energy to the plurality of layers including the constituent material particles and the support portion-forming particles, wherein during the imparting of the energy, the energy is imparted such that a temperature of the constituent material particles in the plurality of layers and a temperature of the support portion-forming particles in the plurality of layers are equal to or higher than a melting point of the constituent material particles and are lower than a melting point of the support portion-forming particles, wherein before the imparting of the energy, in the same layer of the plurality of layers, the first predetermined thickness of the object area is different from a second predetermined thickness of the support area, and after the imparting the energy, in the same layer of the plurality of layers, an after-imparting-of-the-energy thickness of the object area and an after-imparting-of-the-energy thickness of the support area are substantially same, wherein a porosity of the object area is lower than a porosity of the support area in the same layer of the plurality of layers.

2. The method of manufacturing a three-dimensionally formed object according to claim 1, wherein the first predetermined thickness and the second predetermined thickness are determined based on a first reduction degree of the first flowable composition that is a change in volume by the imparting the energy and a second reduction degree of the second flowable composition that is a change in volume by the imparting the energy, the second reduction degree being different from the first reduction degree.

3. The method of manufacturing a three-dimensionally formed object according to claim 1, wherein the imparting the energy includes placing the plurality of layers in a thermostatic chamber.

4. The method of manufacturing a three-dimensionally formed object according to claim 1, wherein in the imparting of the energy, the energy is imparted such that a temperature of the constituent material particles and a temperature of the support portion-forming particles are equal to or higher than a sintering temperature of the support portion-forming particles.

5. The method of manufacturing a three-dimensionally formed object according to claim 1, further comprising:

wherein the imparting of the energy is performed after forming all layers is complete.

6. The method of manufacturing a three-dimensionally formed object according to claim 1, wherein the constituent material particles include at least one component of aluminum, titanium, iron, copper, magnesium, stainless steel, or maraging steel, and the support portion-forming particles include at least one component of silica, alumina, titanium oxide, or zirconium oxide.

7. The method of manufacturing a three-dimensionally formed object according to claim 1, wherein in the forming a plurality of layers, the first ejection nozzle ejects the first flowable composition towards a ceramic plate, the second ejection nozzle ejects the second flowable composition towards the ceramic plate.

* * * * *